United States Patent [19]

Brownbill

[11] Patent Number: 4,494,898
[45] Date of Patent: Jan. 22, 1985

[54] MOUNTING PLASTICS MEMBERS IN OPENINGS IN SHEET METAL MEMBERS

[75] Inventor: Thomas D. Brownbill, Sidmouth, England

[73] Assignee: Metal Box p.l.c., Reading, England

[21] Appl. No.: 371,138

[22] Filed: Apr. 23, 1982

[30] Foreign Application Priority Data

Apr. 23, 1981 [GB] United Kingdom ............... 8112540

[51] Int. Cl.³ ............................................. B21D 51/00
[52] U.S. Cl. .................... 413/14; 29/243.52; 29/520; 413/66
[58] Field of Search ............ 29/520, 432, 798, 243.5, 29/243.52; 413/12, 14, 66, 67, 68

[56] References Cited

U.S. PATENT DOCUMENTS

| | | | |
|---|---|---|---|
| 2,107,428 | 2/1938 | Sexton | 29/520 X |
| 2,176,846 | 10/1939 | Werme | 29/520 |
| 2,177,191 | 10/1939 | Sandberg | 29/520 |
| 2,727,659 | 12/1955 | Nyden | 29/520 |
| 2,738,575 | 3/1956 | Swain et al. | 72/354 |
| 2,985,342 | 5/1961 | Focht | 29/520 |
| 3,037,221 | 6/1962 | Lanius, Jr. | 29/520 X |
| 3,060,562 | 10/1962 | Frarsson | 29/520 |

*Primary Examiner*—Leon Gilden
*Attorney, Agent, or Firm*—Diller, Ramik & Wight

[57] ABSTRACT

A plastics member (16) is sealingly secured to a sheet metal member (10) by creating in the sheet metal member (10) an opening which is defined by a free edge (14) of the sheet metal, forming-up a marginal region (12) of the sheet metal member (10) around the location of the opening, receiving the plastics member (16) in the opening, and re-forming the marginal region (12) so as to close the opening onto the plastics member (16) and cause the free edge (14) to bite into and seal around the plastics member (16).

14 Claims, 10 Drawing Figures

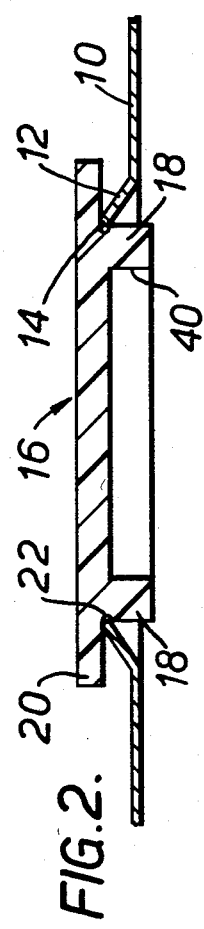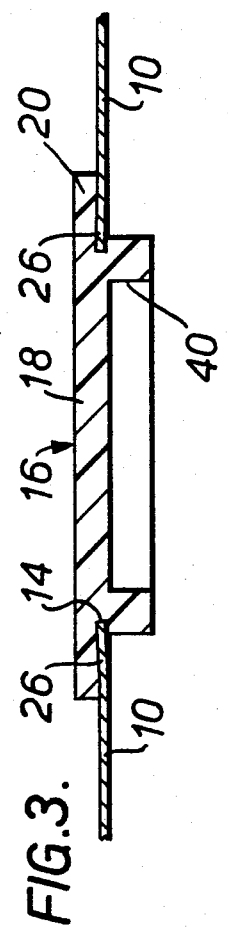

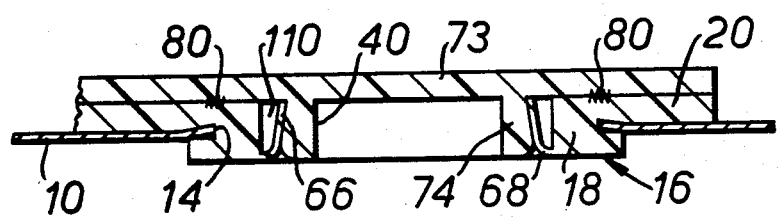
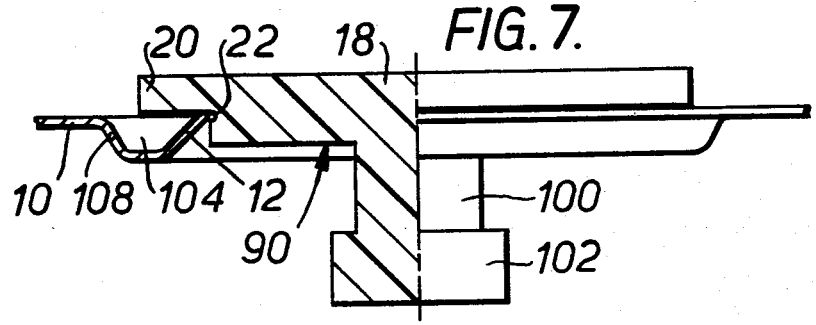
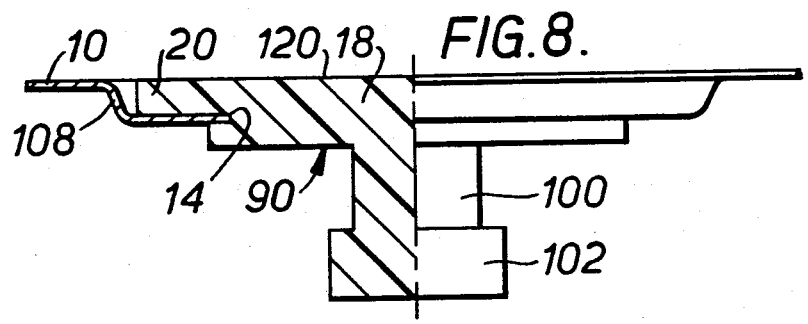

MOUNTING PLASTICS MEMBERS IN OPENINGS IN SHEET METAL MEMBERS

FIELD OF THE INVENTION

This invention concerns the mounting of plastic members in openings in sheet metal members.

More particularly (but not exclusively) the invention relates to the mounting of plastics parts in openings in metal can bodies and can ends for various purposes. For example, the invention is applicable to the provision of metal can bodies (e.g. for paint cans) with rivets on which to mount handles for carrying the cans. By the use of the present invention plastics rivets may be secured to the can bodies in place of the metal rivets which have hitherto been used. Another application of the invention is for fixing easy-opening devices made of plastics material to metal can ends to form easy-opening end closures for cans.

BACKGROUND OF THE INVENTION

The use of plastics where metal had been used before can be advantageous for several reasons, for example for economy and for the prevention of rust and metal-to-metal contact, but previous attempts to mount plastics parts in openings in parts of cans have not been generally satisfactory because of the difficulty of obtaining a secure connection and a good seal. A high seal integrity is especially necessary for food and carbonated beverage products which will deteriorate if not kept in a hermetically sealed environment.

One known way of mounting a plastics member in an opening in a sheet metal member involves forming the metal member with a curled neck around the opening, and inserting the plastics member in a snap-fit manner into the curled neck. The plastics member has a flange preventing it from passing right through the opening, and a body which is an interference fit in the neck; sometimes an entry bead is also provided, which requires to be forced through the opening and which thereafter helps to secure the plastics member in position. However, the plastics member is required to be resiliently deformable for its fitting into the opening, and so there is a tendency for deformation of the plastics material to occur if the body of the plastics member is later subjected to pressure urging it outwardly of the opening; impaired sealing, and possibly even expulsion of the plastics member from the opening, can therefore result.

It is also known to mould a plastics member in situ in an opening in a sheet metal member, the plastics member being thereby dimensioned so as, at least, initially, to be firmly retained within the opening. However, plastics materials have a "memory", and the plastics member may subsequently shrink slightly due to cold creep of the plastics material, so possibly impairing the seal between the plastics and the metal. Plastics creep may also occur in plastics members which are preformed (rather than formed in situ), again tending to impair the plastics-to-metal seal provided.

Thus there is a need for a method and apparatus capable of reliably sealing a plastics member in an opening in a sheet metal member, particularly in the field of can manufacture.

SUMMARY OF THE INVENTION

According to the invention from a first aspect, there is provided a method of mounting a plastics member in an opening which is defined in a sheet metal member by a free edge of the sheet metal, comprising forming-up a marginal region of the sheet metal member around the location of the opening, receiving the plastics member in the opening, and reforming the marginal region so as to close the opening onto the plastics member and thereby cause the free edge to bite into the plastics material.

Because the metal material is deformed to cause it to bite into the plastics material for securing the plastics member in position; a more positive and lasting joint between the two members can be achieved than was hitherto achieved by deforming the plastics material into engagement with the metal. The reformation of the metal enables very high local pressures to be generated at and adjacent the free edge of the opening. The plastics member is only required to deform in response to these high pressures, and can therefore be made from a highly rigid plastics material which ensures good security for the seal.

Although is is preferred that the plastics member should be preformed and inserted bodily into the opening of the metal member, the invention may employ a plastics member which is moulded in situ in the opening. The word "receive" in the penultimate paragraph should be construed accordingly. In the case of a plastics member which is preformed, the plastics member may be disposed in the opening by movement of the plastics member, of the sheet metal member, or of both members.

According to the invention from a second aspect thereof, the invention provides a product which comprises a sheet metal member, and a plastics member mounted in an opening in the sheet metal member by a method forming the first aspect of the invention.

In a preferred embodiment of the invention, a plane area of a sheet metal member is initially formed with an opening, and a marginal region of the metal around the opening is then bent up through an angle typically of 45° to enlarge the size of the opening sufficiently for a preformed plastics member to be inserted into it with little or no deformation of the plastics material. The plastics member is inserted into the opening, after which the metal of the marginal region is reformed back to is original plane condition so as to reduce the size of the opening. As the marginal region is being reformed, its free edge is caused to bite into the plastics member to form a firm and hermetic seal with the plastics material. In order to ensure a satisfactory seal it has been found advantageous to arrange that the free edge of the bent-up marginal region is directed towards the plastics member as the latter moves into the opening.

When the metal of the marginal region is reformed to its plane condition there will be a tendency for wrinkling to occur in the metal; if uncontrolled, such wrinkling may result in impaired sealing. In order, therefore, to control the wrinkling, it is desirable to form regularly spaced, radially directed corrugations about the marginal region as it is being reformed. Such regular and controlled wrinkling has the additional advantage that it increases the rigidity of the metal of the marginal region around the whole of the opening and so improves the strength of the connection.

Corrugating is particularly advantageous when the plastics member is located in a restricted area of metal and a high quality seal capable of withstanding significant pressures is required. An example of such an arrangement is an easy opening closure in a can end which is double seamed to a can for a carbonated beverage product. In the absence of corrugations the reforming of the can end metal onto the plastics member would tend to cause gross and unstable buckling or "panting" of the can end within its seamed connection to the can body. This in turn would cause increased distortion of the metal free edge around the opening in addition to any localised wrinkling of the marginal region directly attributable to the reforming, so that an increased likelihood of leakage between plastics and metal would result. In applications of the invention, where the plastics member is located in a relatively large area of metal in which any gross distortion can be lost, and in particular if the pressures which the seal is required to withstand are small, the corrugations may be omitted.

Further benefits of the invention may be obtained by cold working the plastics member, preferably during and/or after the re-formation of the marginal region of the sheet metal member. With certain plastics materials, this has the effect of reducing or substantially preventing subsequent creep, so helping to maintain the integrity of the plastics to metal seal over prolonged periods of time.

In one embodiment of the invention, cold working of the plastics member is initiated at the same time as the marginal region of the metal is being reformed, by subjecting the plastics member and the marginal region to compressive forces, and is continued after such reformation has been substantially completed. The continued working is preferably achieved with an increased pressure on the plastics member.

In accordance with a third aspect of the invention there is provided an apparatus for mounting a plastics member in an opening in a sheet metal member, comprising first means for forming-up a peripheral region of the sheet metal member around the location of the opening, second means for receiving the plastics member in the opening, and third means for subsequently reforming the marginal region so as to close the opening onto the plastics material and thereby cause the free edge to bite into the plastics material.

A further aspect of the invention features a can end having an easy opening closure comprising a plastics plug secured in an opening in the can end, a plastics closure element receivable in an opening in the plug and sealingly engageable with the plug, and a release member attached to the closure element and manually operable to disengage the closure member from the plug and withdraw the closure element from the plug opening.

BRIEF DESCRIPTION OF THE DRAWINGS

Embodiments of the invention will now be described, by way of example, with reference to the accompanying drawings, wherein:

FIG. 2 is a diagrammatic view of the plastics and sheet metal members in the process of being secured together;

FIG. 3 similarly shows the plastics and sheet metal members when secured together;

FIG. 6 is an enlarged sectional view showing the attachment of the easy-opening device of FIG. 4 to the can end;

FIGS. 7 and 8 are views, partly in section and partly in side elevation, of a plastics rivet and a generally plane blank for a paint can body before and after being secured together by a method as described with reference to FIGS. 1 to 3.

DETAILED DESCRIPTION OF EMBODIMENTS

Figure 1:
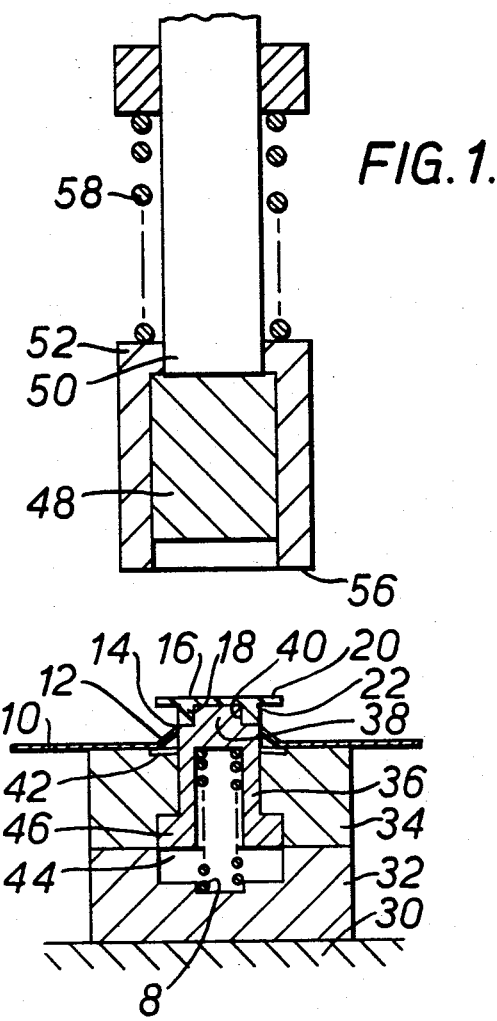
FIG. 1 is a diagrammatic sectional view illustrating the mounting, in accordance with the invention, of a plastics member in an opening in a sheet metal member, showing tooling provided for securing the plastics member in position.

Referring initially to FIGS. 1 to 3, there is shown a sheet metal member 10 having had a circular opening formed in it and defined by a free edge 14. From FIGS. 1 and 2 it will also be seen that a region of the sheet metal around the margin of the opening has been formed-up to create a neck 12 on which the free edge 14 is carried.

The formation of the opening and the associated neck 12 are not shown or described in detail because they may be achieved conventionally. They are preferably achieved in one operation of a single press tool, although this is not essential. In one possible method of forming the opening and the neck, a press tool is arranged so as in a single stroke to create a dimple or depression in the sheet metal member and thereafter to sever the crown of the dimple to form the opening, leaving behind the flank of the dimple as the neck 12. As an alternative, the opening may be formed before the neck rather than after it. Neck shapes can be used other than the frustoconical shape shown.

During its forming-up to form the neck 12, the neck material is stretched peripherally of what is, or will be, the opening, and the length of the metal along the line of the free edge 14 is accordingly lengthened sufficiently for a body portion 18 of a circular plug 16 forming part or all of a plastics member to be inserted into the formed opening with little or no deformation of the plastics material.

In addition to the body portion 18, the plug 16 has an annular flange 20 projecting laterally from one end of the body portion. A peripheral groove 22 is formed around the body portion immediately adjacent to the flange, and when the plug is inserted into the opening the free edge 14 on the neck 12 lies adjacent this groove in generally coplanar relation with it. The position is then as shown in FIG. 2.

After the plug 16 has been inserted into the opening the plug and the neck 12 are compressed between opposed tools, the direction of the applied pressure being orthogonal to the general plane of the sheet metal member. The pressure exerted on the neck progressively reforms the metal material of the neck towards its original plane condition, so causing the opening in the neck to contract as the free edge 14 moves on an arc downwardly and inwardly. As the size of the opening decreases, the free edge 14 moves into the groove 22 in the plug and then bites into the plastics material at the base of the groove. By the time that the neck material has been reformed substantially to its plane condition (FIG. 3), the free edge 14 is firmly buried in the body portion 18 of the plug 16, so forming a secure and hermetic seal between the two members. Typically, the penetration of the edge 14 into the plastics material is 0.35 mm where the body portion is of polyethylene and 0.75 mm where the body portion is of polypropylene. The penetration will preferably lie within the range of 0.2 mm to 2 mm.

As previously mentioned, the initial deformation of the sheet metal member 10 to form the neck 12 involves stretching of the neck material peripherally of the opening. Thus, when the metal in the neck is later reformed towards it original plane condition, there is a tendency for folding or wrinkling to occur in the neck material, with possible impairment of the integrity of the plastics-to-metal seal. In order to control such folding or wrinkling so that little or no seal impairment results, regular corrugations 26(FIG. 3) are formed in the metal of the neck 12 as reforming proceeds. As can be understood from FIG. 1A which shows a lower tool of the tooling by which the corrugations 26 are formed, the corrugations are in the form of shallow undulations with alternately directed crests which rise at the outer periphery of the neck material and extend radially inwardly to their peak amplitude at the free edge 14 of the metal. The corrugations 26 further help to ensure seal integrity by increasing the rigidity of the reformed metal regularly around the whole periphery of the opening.

In addition to achieving the reformation of the neck 12 as described above, the vertical compression by the tooling also has the effect of cold working the plastics material of the plug 16. Any "memory" which the plastics material possesses from its moulding operation is thereby destroyed, so reducing any tendency of the plastics material to subsequently creep and, by shrinkage of the plug 16, possibly impair the plastics-to-metal seal which has been achieved.

Figure 1A:
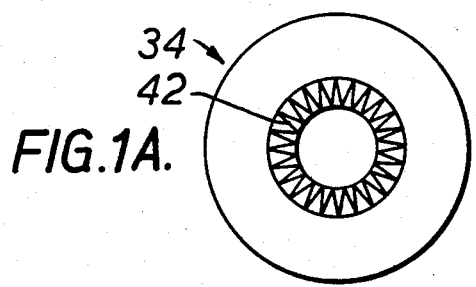
FIG. 1A is a plan view of the lower part of the tooling, as seen from above.

Tooling suitable for attaching the plug 16 to the sheet metal member 10 will now be described in detail with reference to FIGS. 1 and 1A. FIG. 1 shows the tooling to comprise an essentially fixed lower tool and an upper tool which is mounted above the lower tool and arranged for vertical reciprocating movement towards and away from the lower tool.

The lower tool is mounted on a bedplate 30 and comprises lower and upper blocks 32,34 which are bolted to one another and to the bedplate so as to form an anvil for the upper tool.

A locating spigot 36 is held captive in a cavity 44 formed by the blocks 32,34, and is biassed upwardly by a compression spring 8 so as to project beyond the top surface of the upper block 34. This surface is plane except for undulations 42 (FIG. 1A) which are arranged to form the corrugations 26 on the reformed neck material as previously described.

The spigot 36 is circular in horizontal section, its diameter being the same as that of the body portion 18. Its top end is arranged to support and locate the plug 16; accordingly it has a central boss 38 dimensioned to fit snugly into a recess 40 formed on the underside of the body portion.

The upper tool comprises a compression head 48 mounted on an actuating shaft 50 by which it can be raised and lowered towards and away from the lower tool, and a collar 52 which is slidable on the head and biassed downwards in relation to the head, to the limiting position shown, by a compression spring 58. In this position the annular lower surface 56 of the collar stands proud of the plane lower surface (unnumbered) of the compression head 48, so that the collar and head in combination form a recess in which the plug 16 can be received with a small clearance around the flange 20.

Operation of the tooling is as follows:

The sheet metal member 10, already formed with its opening and the surrounding neck 12, is located over the spigot 36 as shown, and the plug 16 is fitted onto the end of the spigot. The upper tool is then lowered to bring the head 48 into contact with the upper surface of the plug 16 and, by depressing the plug and the spigot 36 against the action of the spring 8, cause the plug 16 to be inserted into the opening of the sheet metal member.

Continued downwards movement of the shaft 50 thereafter causes the head 48 to compress the neck 12 through the medium of the flange 20, so that the neck 12 is reformed in the manner described above to secure the plug in the opening.

The collar 52 moves in unison with the compression head 48 during an initial part of the downward movement of the upper tool. It engages the sheet metal member 10 over an annular region surrounding the neck 12 just before the reforming operation on the neck has begun, and thereafter clamps the sheet metal resiliently against the lower tool so as to hold the sheet metal steady and restrict its deformation to the neck material.

When the neck has been deformed substantially into the plane of the sheet metal member 10, the spigot 36 bottoms on the lower block 32 and stops moving. The head 48, however, undergoes a smaller further movement at a substantially increased, i.e. high, pressure, during which the plastics material of the plug, including the wall of its body 18, is strongly compressed at room temperature over its whole plan area, and in this way the plug is cold worked to reduce any tendency for the plastics material subsequently to creep and so jeopardise the integrity of the plastics-to-metal seal. The further movement of the head 48 at high pressure also completes the formation of the corrugations 26 on the neck material by means of the formations 42, and beds the neck material intimately with the underside of the flange 20.

Using the above method it has been found possible to achieve a seal which will withstand pressures of 67 psi at 150° F., and this opens up a wide range of products for which the closure is suitable.

Figure 4:
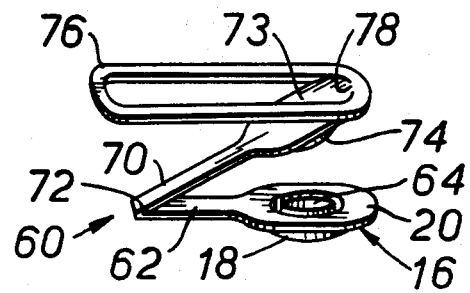
FIG. 4 is a perspective view of an easy-opening device which is to be mounted in an opening in a can end by a method as described with reference to FIGS. 1 to 3.
Figure 5:
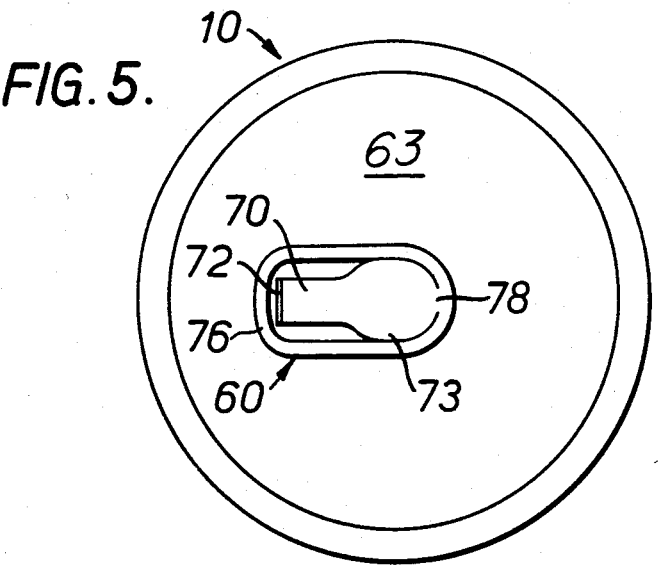
FIG. 5 is a plan view of the easy-opening device of FIG. 4 when secured to the can end.

FIGS. 4 to 6 show the attachment of a particular sheet metal member 10 and plug 16 by a process as just described. The sheet metal member 10 is a metal end for a carbonated beverage can, and accordingly has a peripheral seaming ring unnumbered, (FIG. 5) at which it may be double seamed to a can body. Within the seaming ring the end has a generally plane closure panel 62 which is formed with a central opening defined by a free edge 14 (FIG. 6). Although not apparent from the drawings, it is to be understood that before the plastics member is fitted, the free edge 14 is carried on a formed-up neck provided by a marginal region of the can end surrounding the opening as previously described.

The plug 16 forms part of the integrally moulded easy-opening device 60 shown in FIGS. 4 and 5. The device 60 has a first portion 63 (FIG. 4) which incorporates the plug 16 with its body portion 18 and flange 20. As best seen in FIG. 6, within the body portion 18 there is a central opening 64 which is defined by a flexible lip 66 of generally frustoconical form. The lip extends upwardly from the base of the body portion 18 in a generally reentrant manner, so to form a peripheral channel 110 with the body portion around the opening 64. At the bottom of this channel the lip is formed with several vent holes 68.

A second portion 70 of the closure 60 is joined to the first portion 62 by a film hinge 72, and includes a stopper portion having a closure disc 73, and a tubular skirt 74 which is carried by the closure disc and is a push fit into the lip 66. The skirt accordingly has a frustroconical outer surface arranged to co-operate with the lip in a sealing manner.

In addition to the stopper portion the second portion 70 includes a pull ring 76 which is joined to the stopper portion by a film hinge 78. Normally, and as shown in FIG. 5, the ring lies flat against the can end 10, but it can be lifted away from the can by the consumer, and then used to pull the skirt 74 out of the opening 64. The opening 64 is then available as a dispensing orifice for the can to which the can end 10 is fitted. If desired, the skirt can be replaced in the opening as a reclosure.

The device 60 is moulded in an open state in which the stopper skirt 74 is free from the opening 64. It is prepared for attachment to a can end by folding the two portions 62,70 together so as to insert the stopper skirt 74 into the opening 64, and heat sealing the portions together around the opening 64 as indicated by the reference 80 in FIG. 6. Such heat sealing may form a continuous annular heat seal around the opening, or it may be effected at a number of spaced locations. It is rupturable to allow the device to be operated for dispensing product.

After heat sealing, the unit is ready to be fitted to the can end 10 in the manner already described. During the attachment the top surface of the closure disc 73 serves as the upper surface of the closure, for engagement by the head 48 (FIG. 1). In addition, the skirt 74 provides a locating recess 40 for receiving the boss 38 on the lower tool.

Figure 9:
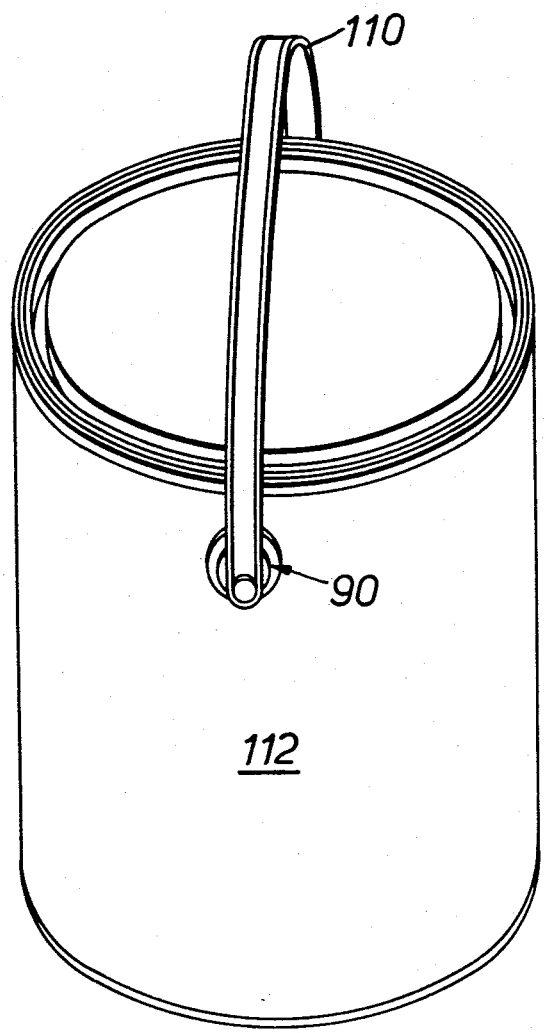
FIG. 9 is a perspective view of a paint can employing the blank and rivet illustrated in FIGS. 7 and 8.

Turning now to FIGS. 7 to 9, there is shown a plastics rivet 90 which is one of two such rivets to be secured to a generally sheet metal blank 10 destined to form the cylindrical body 112 of a paint can (FIG. 9) Each rivet then serves as pivot for one end of a plastics handle 110 for the can.

The rivet has a body 18 formed with a groove 22 and a flange 20, and in that respect corresponds to the embodiment of FIGS. 4 to 6. Unlike the previous embodiment, however, the rivet 90 provides no locating recess corresponding to the recess 40, but instead has a projecting shank 100 terminated by a heat 102. The lower tool of the reforming apparatus (FIG. 1) is accordingly modified to accommodate the shank and the head so as to achieve location of the rivet for the reforming operation.

The blank 10 also differs from the can end in that its formed-up neck 12 is carried in offset relation to the general plane of the sheet metal, and is directed in a reentrant manner so as to form a channel 104 in combination with the offsetting shoulder 108. The upper and lower tools of the reforming apparatus are modified accordingly. As before, the neck 12 carries the free edge 14 defining an opening in the sheet metal.

Each rivet 90 is attached to the blank 10 generally in the manner previously described, and no detailed description is therefore given. FIG. 8 shows one of the rivets after it has been attached in position, and from that Figure it will be seen that the plane top surface 120 of the rivet lies flush with the adjacent surface of the blank 10, that is, the surface destined to form the inside surface of the paint can body 112. This ensures that the interior of the paint can is unobstructed. The shank 100 and head 102 together with part of the body portion 18 project outwardly from the blank 10 by a sufficient distance to allow free pivotal movement of the paint can handle 110 in use.

The connections formed according to the invention are robust and can provide a lasting seal. This is particularly advantageous in the manufacture of cans which are subject to super-atmospheric pressure at any time to the point of use. Further, since the connection once formed results in plastic-to-metal, rather than metal-to-plastic, contact wherever contact occurs, the likelihood of damage to any protective coating on the surface of the metal and consequential corrosion is minimised. This in turn is advantageous where a can employing the present connection is to be used for food or beverage products.

The material of a plastics member of the present invention may be, for example, a co-polymer of propylene and ethylene, a polyamide, polypropylene, polystyrene, high density polyethylene, low density polyethylene, or ABS.

Although in each of the described embodiments the (or each) plastics member is formed with a groove to locate and receive the free edge of the formed-up neck on the sheet metal member prior to reforming, this is not believed to be essential; in some applications of the invention the neck may be reformed into sealing engagement with a generally cylindrical, ungrooved part of the plastics member.

Although the invention has been particularly described in relation to the attachment of a preformed plastics member to a sheet metal member, it is nevertheless within the scope of the invention to use plastics members which are moulded in situ in the opening in the sheet metal member.

Whereas the described embodiments employ circular openings and correspondingly shaped plastics members, the invention extends to the use of non-circular openings, for example in the shape of a pear.

I claim:

1. A method of mounting a plastics member in an opening which is defined in a sheet metal member by a free edge of the sheet metal, comprising forming up a marginal region of the sheet metal member around the location of the opening, receiving the plastics member in the opening, reforming the marginal region and thereby closing the opening onto the plastics member and causing the free edge to bite into and seal around the plastics member, and proving corrugations in the marginal region of the sheet metal member comprising undulations in the sheet metal having alternate peaks and troughs, each commencing at a location spaced from the free edge and extending radially inwardly towards the free edge.

2. A method according to claim 1, comprising preforming the plastics member, and inserting the plastics member bodily into the opening.

3. A method according to claim 2, comprising directing the free edge towards the plastics member as the plastics member is inserted into the opening.

4. A method according to claim 1, comprising molding the plastics member in situ within the opening.

5. A method according to claim 1, comprising forming the corrugations whilst the marginal region is being re-formed.

6. A method according to claim 1, comprising cold working the plastics material of the plastics member when received in the opening.

7. A method according to claim 6, comprising effecting the cold working of the plastics material whilst the marginal region of the sheet metal member is being re-formed.

8. A method according to claim 6, comprising effecting the cold working of the plastics material after the marginal region of the sheet metal member has been substantially re-formed.

9. A method according to claim 1 wherein the plastics member is a rivet and the metal blank is a can body, and attaching a handle to the rivet.

10. The method according to claim 1 wherein the metal blank is a can end and the plastics member is an easy open enclosure.

11. Apparatus for sealing a plastics member in an opening in a sheet metal member, the sheet metal member having a free edge defining the opening and a marginal region around the location of the opening, comprising first means for forming up the peripheral region of the sheet metal member around the location of the opening, second means for receiving the plastics member in the opening, third means for subsequently reforming the marginal region so as to close the opening onto the plastics member and cause the free edge to bite into and seal around the plastics member, the third means including means for forming corrugations in the marginal region of the sheet metal member, which corrugations comprise undulations in the sheet metal having alternate peaks and troughs, each commencing at a location spaced from the free edge and extending radially inwardly towards the free edge.

12. Apparatus according to claim 11, wherein the third means are arranged to cold form the plastics material of the plastics member whilst re-forming the marginal region of the sheet metal member.

13. Apparatus according to claim 11, wherein the third means are arranged to cold form the plastics material of the plastics member after substantially re-forming the marginal region of the sheet metal member.

14. The combination of a sheet metal member and a plastics member mounted in an opening in the sheet metal member by a method according to claim 1.

* * * * *